Feb. 10, 1931.  J. I. MORRALL  1,792,025
PHOTOGRAPHIC APPARATUS
Filed March 20, 1930   5 Sheets-Sheet 1
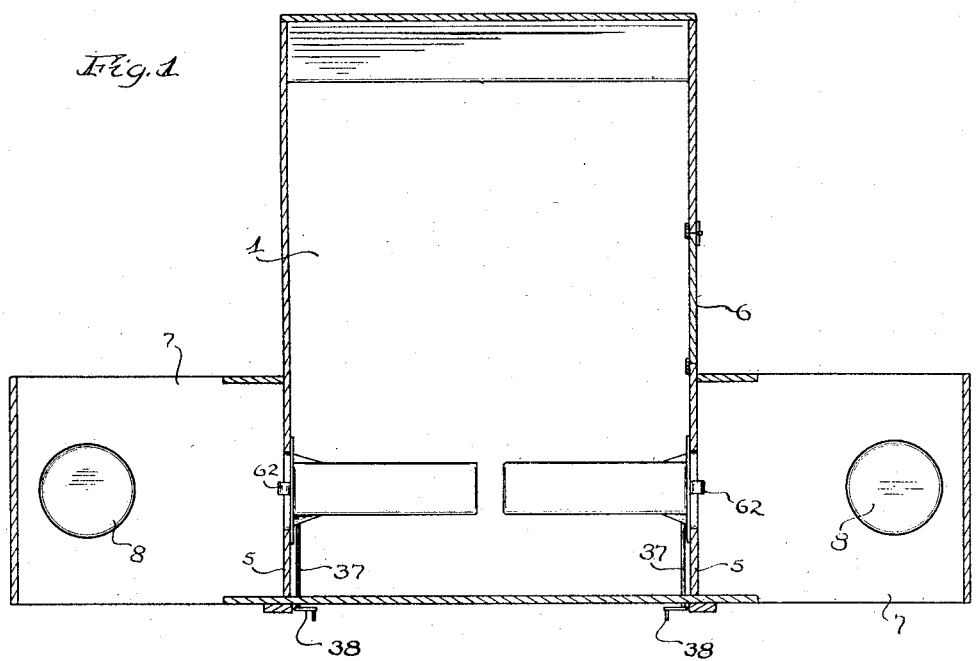
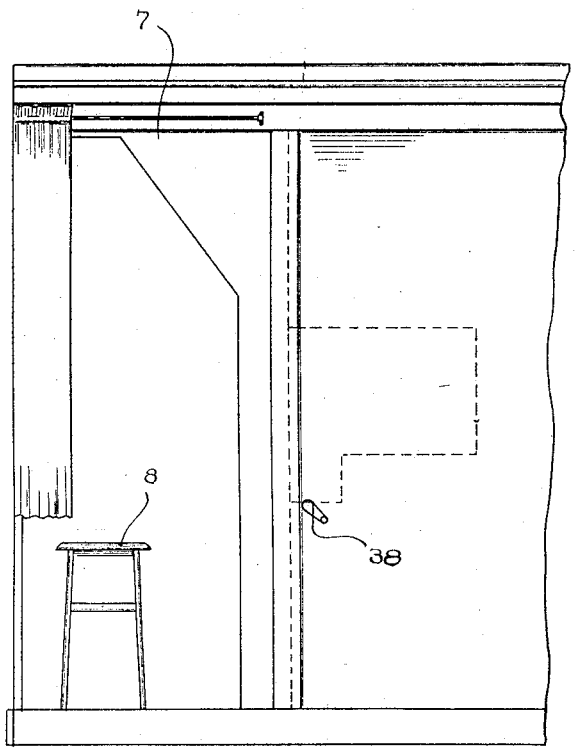
INVENTOR
James I. Morrall
BY
his ATTORNEY

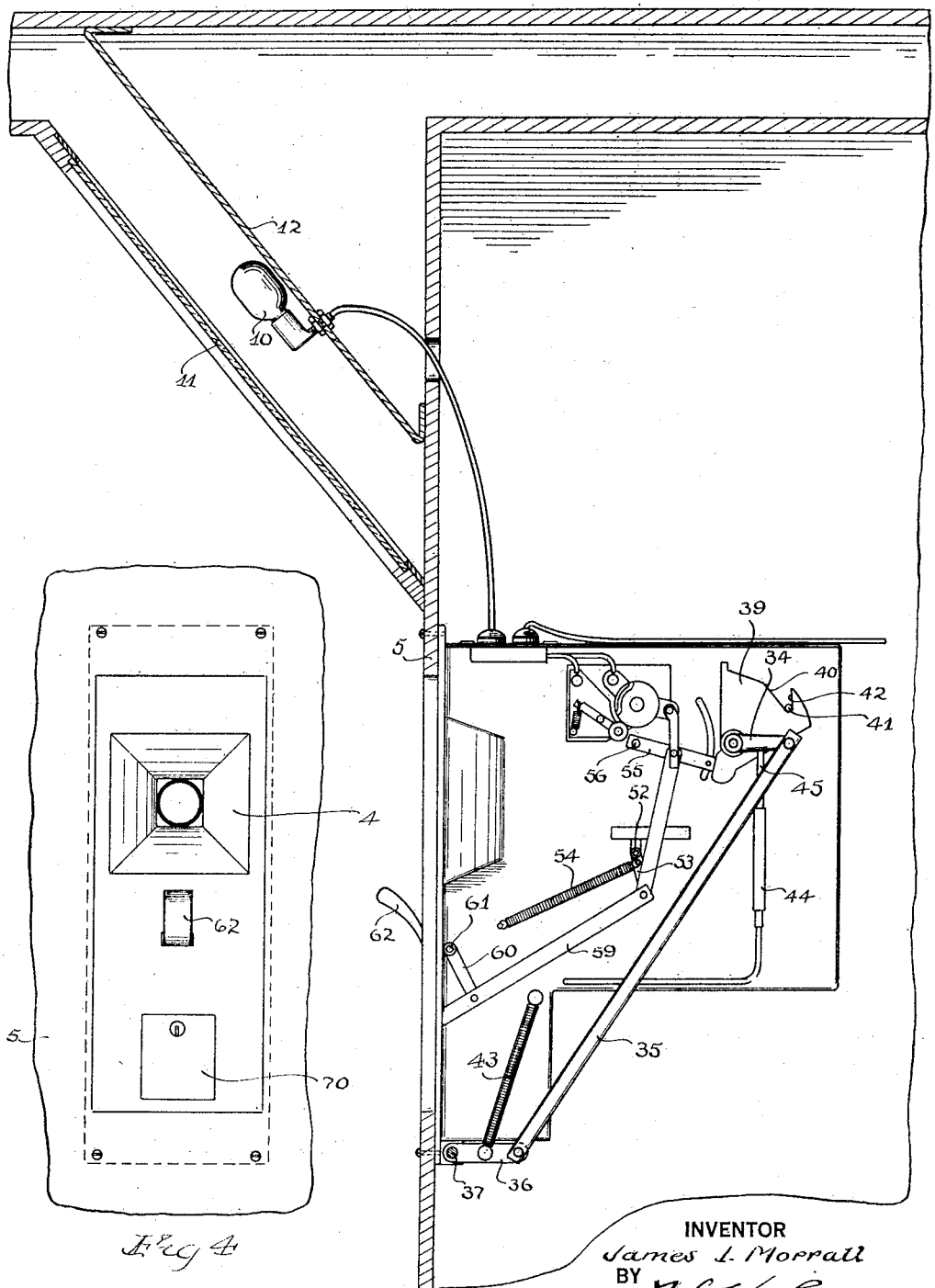

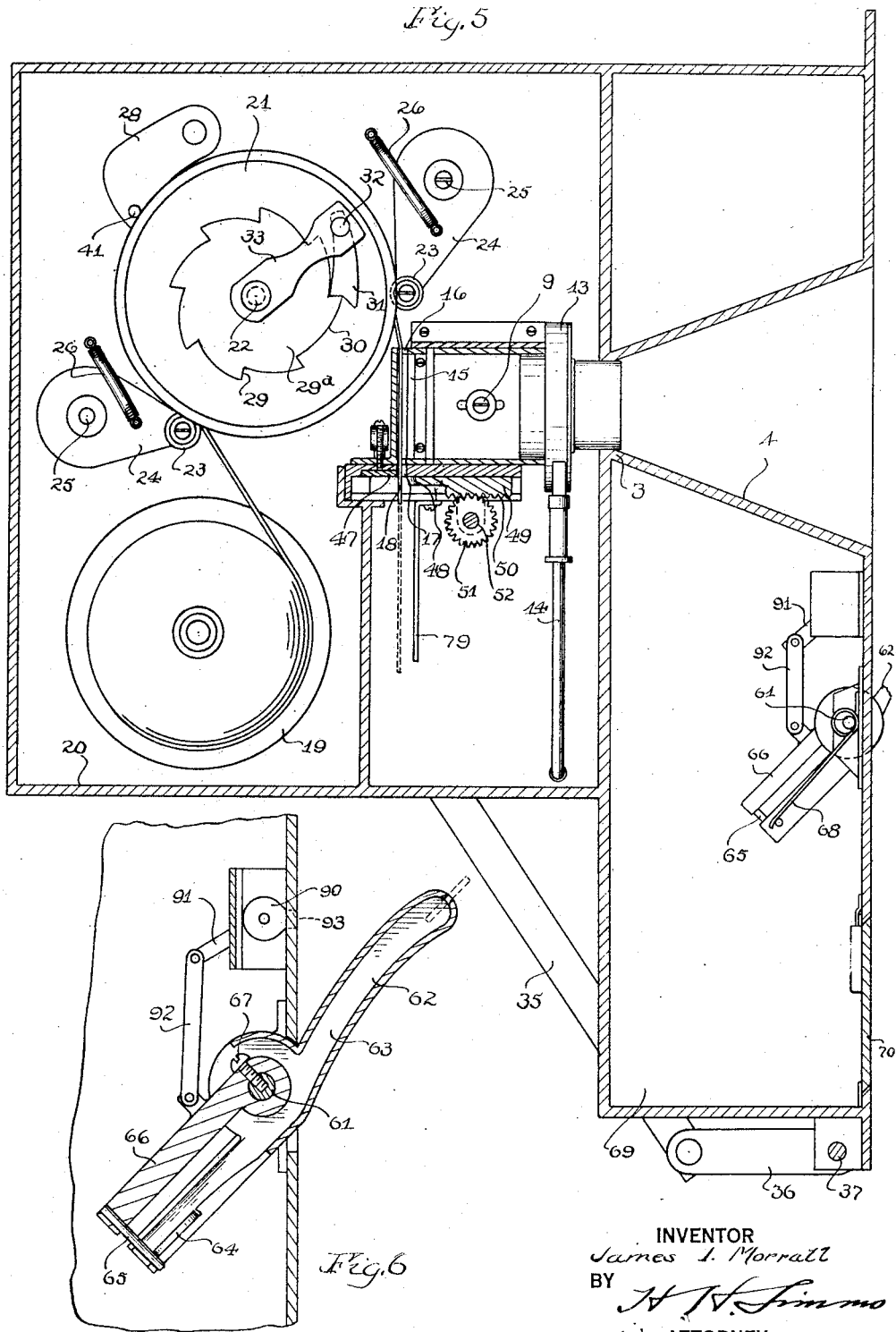

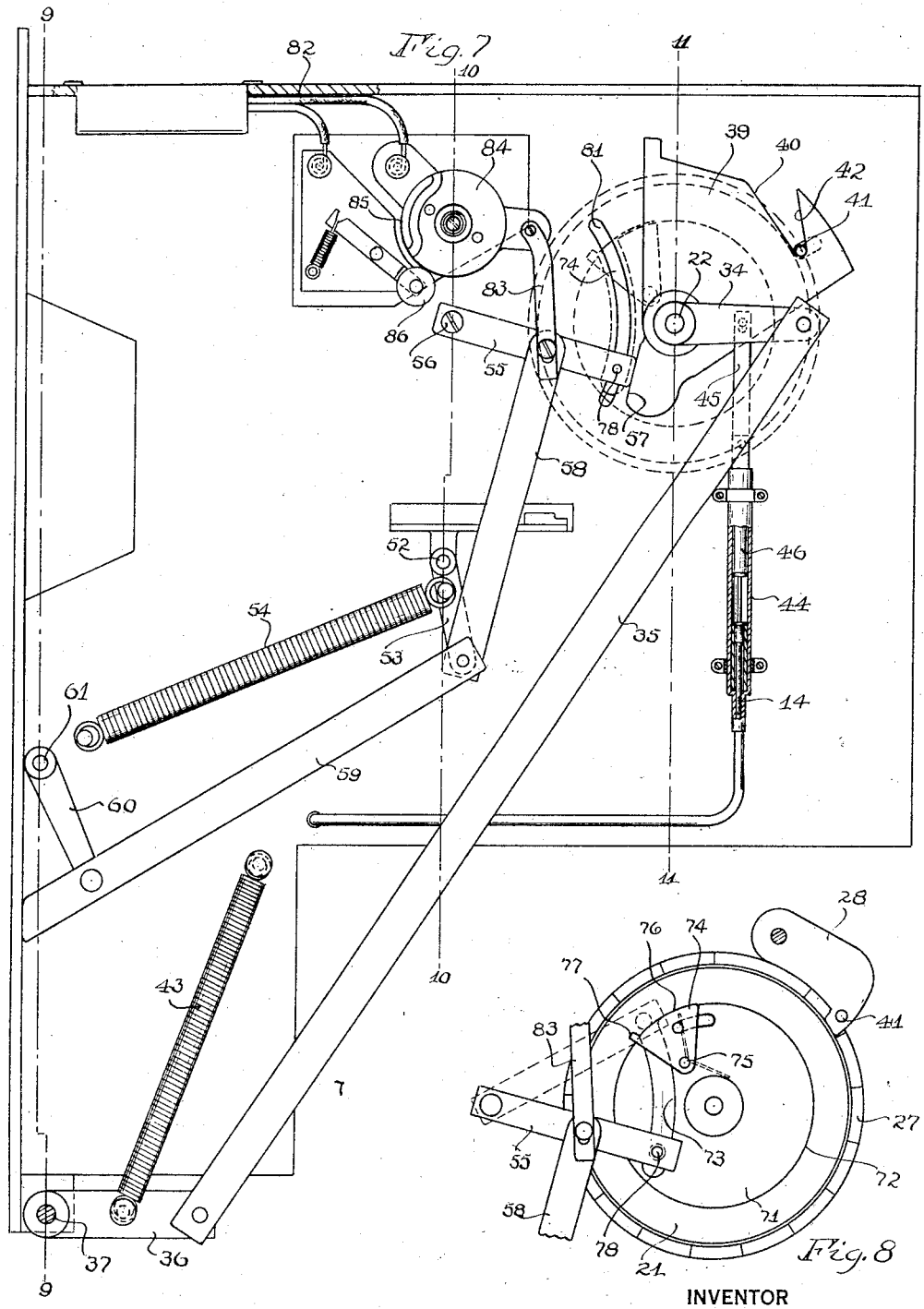

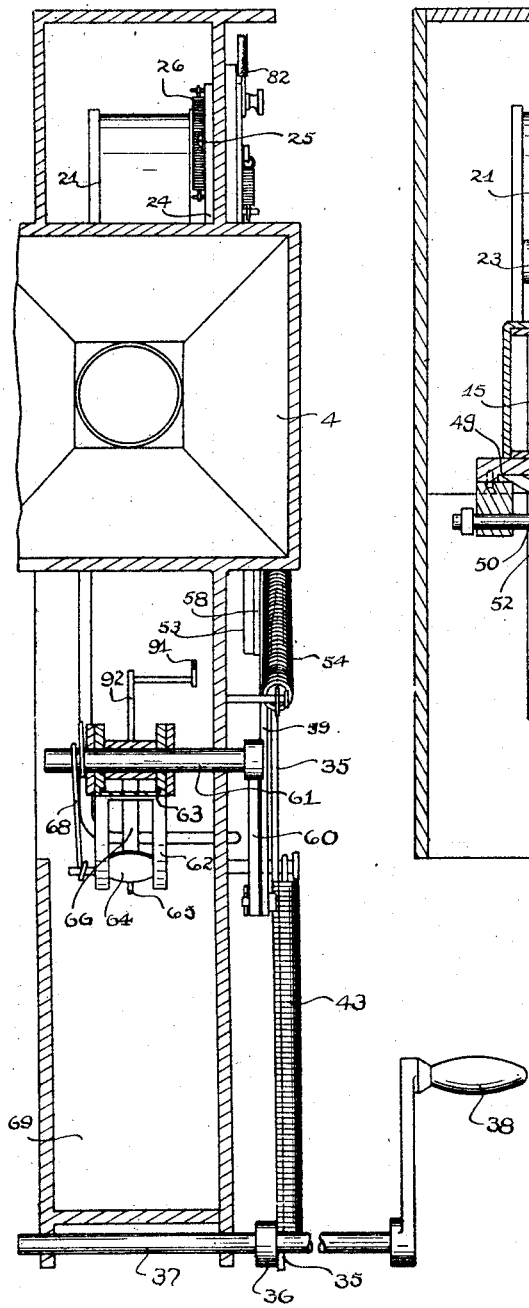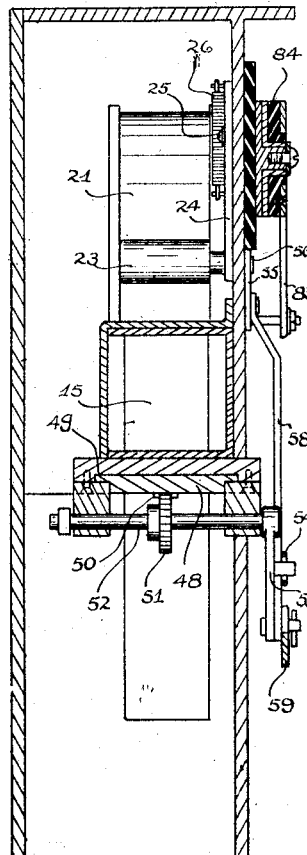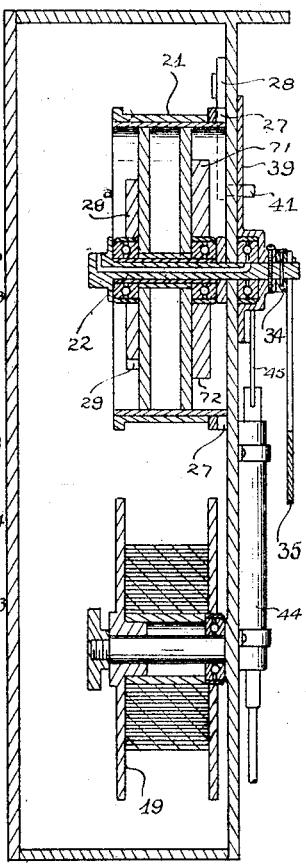

Patented Feb. 10, 1931

1,792,025

UNITED STATES PATENT OFFICE

JAMES I. MORRALL, OF ROCHESTER, NEW YORK, ASSIGNOR TO QUARTERMATIC PHOTOS INC., OF ROCHESTER, NEW YORK, A CORPORATION OF NEW YORK

PHOTOGRAPHIC APPARATUS

Application filed March 20, 1930. Serial No. 437,489.

The present invention relates to photographic apparatus and an object thereof is to provide a construction in which two manually controllable mechanisms are employed, one for effecting the exposure and the feeding of a strip of sensitized material and the other to effect the operation of a detaining means which holds the first named manually controllable means against operation, and also the operation of a severing means which severs the exposed portion of the strip. Another object of the invention is to provide a construction in which the taking of the exposures may be effected manually only after the machine has been adjusted manually through a coin controlled mechanism. Still another object of the invention is to provide a photographic machine having associated therewith in a novel manner an illuminating means which is effective only while the machine is conditioned for taking pictures. A further object of the invention is to provide a novel means for feeding a sensitized sheet. A still further object of the invention is to provide a novel manner of combining an exposure mechanisms with a strip feeding mechanism for operation by a common means. Still another and further object of the invention is to associate with a detaining means which holds an exposure and a strip feeding mechanism against operation, a holding means which will permit a predetermined number of operations of the exposure and the feeding mechanism. A still further object of the invention is to provide a novel holding means for a means which detains against movement an exposure mechanism and a feeding mechanism for a strip of sensitized material.

To these and other ends, the invention consists of certain parts and combinations of parts, all of which will be hereinafter described: the novel features being pointed out in the appended claims.

In the drawings:

Fig. 1 is a horizontal section through a cabinet in which the apparatus is embodied;

Fig. 2 is a fragmentary front elevation of the cabinet;

Fig. 3 is an enlarged fragmentary view of the cabinet showing the arrangement of the illuminating means;

Fig. 4 is an enlarged detail view of the front of a projecting device and parts adjacent thereto;

Fig. 5 is an enlarged fragmentary view partially in section showing the exposure mechanism, the strip feeding mechanism and the severing mechanism.

Fig. 6 is a detail view of the coin controlled manual operator for the detaining means, the severing means and the illuminating means;

Fig. 7 is a side view of the operating mechanisms for the exposure mechanism, the feeding mechanism, the severing mechanism, the illuminating means, and the detaining means;

Fig. 8 is a detail view of the holding means for the detaining means and adjacent parts;

Fig. 9 is a section on the line 9—9, Fig. 7;

Fig. 10 is a section on the line 10—10, Fig. 7; and

Fig. 11 is a section on the line 11—11, Fig. 7.

The invention is herein illustrated in a photographic apparatus in which there is employed a cabinet having a chamber 1 serving as a developing room and containing one or more cameras, preferably two, having their lens carriers 3 connected by flared portions 4 with openings in opposite side walls 5. A door 6 is provided in the cabinet through which access may be obtained to the cabinet. Opposite each exposure opening in the side walls of the cabinet is a covered extension compartment 7 containing a seat 8 for a person whose picture is to be taken, the seat being arranged in properly focused position to the adjacent lens carrier 3 which may be moved axially through an adjusting device 9 to obtain the desired focus.

Above each seat 8 is a means for illuminating a person on such seat. This illuminating means comprises, in this instance, a lamp 10 of high candle-power having a light diffusing plate 11 in front thereof and at an angle to the horizontal and a reflector 12 in rear thereof so as to throw the rays on the seat 8.

The camera is controlled by an automatic shutter 13 of any suitable construction having a cable release 14. The exposure chamber 15 of the camera has slots 16 and 17 in the top and bottom walls thereof through which a strip 18 of sensitized material is passed.

The sensitized material is preferably wound on a spool 19 supported for free rotation in the casing 20 of the camera below the lens the strip being passed upwardly from the spool about a feeding roll 21 mounted to turn on a shaft 22 which is journalled in the casing 20 above the spool 19. After passing in rear of and above the spool 21, the strip of sensitized material passes downwardly from the spool 21 through the exposure chamber 15 entering the top of the chamber and passing from the bottom. The strip 18 is held in a taut condition about the spool 21 by means of rollers 23 formed of rubber and supported resiliently against the strip 18 by means of arms 24 pivoted at 25 to the casing 20 and acted upon by springs 26. One of the rollers bears on the strip as the latter passes downwardly to the exposure chamber, whereas, another bears on the strip as it passes to the roll 21 from the roll 19.

To prevent the free turning of the feeding roll 21, the latter may be provided with notches 27 in any one of which a pivoted pawl or detent 28 is adapted to engage. Movement of the feeding roll may be effected by providing the latter with a plurality of teeth or shoulders 29 arranged on a disk 29ª in a series about the axis of turning of the roll 21 and equi-distantly spaced except as at 30 for two, forming the last and the first of the series. With these teeth or shoulders are adapted to engage a pawl 31 pivoted at 32 to an arm 33 rigidly secured to the shaft 22. The oscillating of this shaft effects a step by step feeding of the strip 18 an equal distance each time except the last feeding step of each series when a greater feeding action takes place. The purpose of this is to give a greater distance between each series of pictures than between the individual pictures of a series. The oscillation of the shaft 22 and the arm 33 may be effected by an arm 34 on said shaft 22 connected by a link 35 with an arm 36 on a rock or operating shaft 37 for the apparatus as a whole, this operating shaft lying beneath the casing 20 adjacent to a side wall 5 and having at one end on the outside of the chamber 1 a crank handle 38 for operation by an attendant. A spring 43 acts on the arm 36 to hold said arm and the parts connected therewith in normal positions.

With the end in view of shifting the holding detent 28 out of and into connection with the feeding roll 21, a detent shifter is provided comprising a plate 39 secured to the shaft 22 and formed with a cam surface 40 arranged to engage with a projection 41 on the detent 28 to move the latter away from the shoulders 27 on the roll 21, the detent having a normal tendency under the action of gravity to move to detaining position. The shifter 39 also has a cam surface 42 adapted to engage the projection 41 to insure the movement of the detent to detaining position when the shifter 39 is moved to normal position. It is apparent that each time the handle or operator 38 is swung in one direction the sensitized strip 18 will be fed one step to present another portion of the strip to exposure position. In order that at each time a new portion of the strip will be moved to exposure position, the automatic shutter will be opened and closed, the cable release 14 is secured to a tubular member 44 so that the plunger end of the cable release projects into the tubular member. The latter is rigidly secured to the casing 20 below the arm 34 which has pivoted thereto a link 45 also pivoted to a plunger 46 operating in the upper end of the tubular member 44 to cooperate with the plunger of the cable release.

After a predetermined number of exposures are made on the sensitized strip, in this instance, eight corresponding to the number of teeth 29, the exposed portions are severed from the strip. This is effected, in this instance, by a severing mechanism comprising, in this instance, a stationary but adjustable knife or cutter 47 arranged in rear of the slot 17 and cooperating with a movable knife or cutter 48 guided horizontally below the exposure chamber at 49 and, in this instance, carrying a rack 50 with which may mesh a pinion 51 on a shaft 52. The shaft 52 carries an arm 53 with which a spring 54 connects to give the cutter 49 a tendency to move toward cutting position.

With the end in view of preventing the operation of the shutter and the feeding means of the sensitized strip, there is provided a locking device comprising a detent or lever 55 pivoted at 56 and having its free end arranged to cooperate with an eccentric shoulder or abutment 57 on the shaft 22. This abutment connects by a link 58 with the arm 53 and the latter through a link 59 pivoted thereto connects with an arm 60 on a shaft 61. The end of the link 59 abuts the wall 5 and serves to limit the movement of the link in one direction under the action of the spring 54.

The turning of the shaft 61 to release the shutter operating mechanism and the sensitized strip feeding mechanism from the detent or locking device 55 may be effected by a lever 62 which is mounted to turn loosely on the shaft 61 and has one end projected on the outside of the chamber 1 toward one of the seats 8. This lever may have an anchoring groove or way 63 for directing a coin or other insertible device 64 toward the lower end of the lever against a stop or abutment 65 which projects laterally or downwardly from an arm 66 rigidly secured by a setscrew 67 to the shaft 61 and lying above the insertible device 64. When the insertible device 64 is in position and the outer end of the lever 62 is depressed, the device 64 will engage the arm 66 and shift the latter causing the turning of the shaft 61 and consequently the movement of the detent out of the path of the abutment 57 and the shifting of the cutter 49 away from the stationary cutter 48. On the release of the lever 62, a spring 68 returns the latter to normal position, and the inserted device 64 being released drops into the receptacle 69 to which access is obtained through a lock controlled door 70.

In order to provide for holding the detent 55 against return until the predetermined number of pictures have been exposed and at the same time to effect automatically the severing of the exposed portion of the sensitized strip after the predetermined number of exposures, a secondary detaining means is provided comprising, in this instance, a member or disk 71 secured to the feed roll 21 to turn therewith and having a curved periphery 72 concentric with the axis of turning of the roll 21 and intersected by an arcuate slot 73 formed in the disk 71. At the mouth of this slot is arranged a closing dog 74 pivoted at 75 to the disk 71 and having a curved edge 76 which coincides with the curved periphery 72 when in closing position and a projection 77 beyond said edge 76. A pin 78 extending laterally from the detent 55 lies in the slot 73 when the detent 55 is in detaining position and as such detent 55 moves away from detaining position the pin 78 travels in the slot 73 until it engages one side of the closing dog 76 shifting said dog to open the slot so that the projection or pin 78 may pass beyond the closing dog thereby freeing the latter and permitting it to return to closing position so that the detent is prevented from reentering the slot 73 as shown in Fig. 8 thus holding it out of detaining relation to the abutment 57, preventing the spring 54 moving the movable cutter 49 to sever the exposure strip, and holding the abutment out of the path of the coin or inserted device 64. As the feed roller 21 turns under the action of the step-by-step feeding mechanism, the projection or pin 78 travels first on the curved portion 76 of the closing dog and then on the curved periphery of the disk 71. During this time successive portions of the sensitized strip are being exposed, and after the last exposure, the pin 78 engages the projection 77 and shifts the closure 74 to open the slot 73 so that the pin 78 may enter the slot 73 and permit the detent 55 to move to detaining position to prevent any more exposures or strip feeding and to effect the severing of the exposed portion of the strip. The severed portion of the strip passes behind a wall 79 to any suitable point in the chamber 1 where an operative will develop the same by materials and apparatus (not shown) within the chamber. The wall 79 confines the strip and prevents it from becoming damaged by the mechanism for moving the knife.

In this instance, the detent 55 and its operating parts are with some of the operating parts of the feed roll 21 arranged on the outer side of a side wall of the camera casing while the feed roll with the detaining disk 71 are arranged within the camera casing 20 and it is therefore necessary to provide the side wall with an arcuate slot 81 through which the pin 78 may project to reach the detaining disk 71.

It is preferred that the light 10 shall burn only during the period while the eight successive exposures are taking place, and to this end, a switch is provided in the circuit 82 of the lamp, said switch being preferably controlled by the lever 62. In this instance, a link 83 connects the detent 55 with the oscillatory switch member 84 having a contact portion 85 movable into and out of engagement with a roller contact 86. It is apparent that with this arrangement, the lamp 10 is lighted only while a series of pictures are being taken and is extinguished when a series of exposures is completed.

A count may be kept of the number of coins deposited in the machine by means of a counting unit 90 having an arm 91 connected to move with the arm 66 by means of a link 92. A window 93 is cut into the housing to expose the numbers on the counting unit.

The operation of the invention will be understood from the foregoing but it may be summarized as follows. An operative is stationed within the chamber 1 and one is stationed in front of the cabinet adjacent the two manually operable handles 38. A customer or patron is seated on the seat 8. Upon the dropping of a coin in the slot of the manually operable lever 62, the latter will connect with the shaft 61 of the mechanism for effecting the operation of the detaining means, the severing means and the illuminating means or in other words the mechanism which shifts the detent 55 out of the path of the abutment 57 also shifts the shaft 52 of the severing mechanism to move the cutter 49 away from the cutter 48, also turns the switch member 84, and also stores energy in the spring 54. This mechanism is held against return under the action of the spring 59 first by the detent or latch 74 on the disk 71 and then by said disk until the latter has made a complete rotation when the projection 78 again enters the slot 73 and permits the detent 55 to return to detaining position, the switch member 84 to open the electric circuit and stop the illumination, and the gear 51 to be turned to cut off the exposed portion of the sensitized strip. The return action of said manually operable mechanism under the spring 54 does not occur however until the proper number of exposures has taken place.

The operation of the exposure mechanism or shutter 13 as well as the step-by-step feeding action of the sensitized strip can take place only when the detaining means 55 is moved out of the path of the abutment 57. Both of these actions are effected by the common operator or controller 38 which is operated by the operative or attendant outside the cabinet and turns the shaft 22 thereby operating the cable release of the shutter 13 and also operating the step by step feeding mechanism of the sensitized strip one step. Until eight successive movements of the operator 38 takes place giving eight different exposures on the sensitized strip, the detent 55 is held against return. An exposure takes place when the operator 38 moves in one direction and the feeding of the strip takes place when the operator moves in the other direction under the action of the spring 43.

After the exposed portion of the strip has been cut off, it is immediately developed within the chamber 1 by the operative therein, thus giving a quick service.

What I claim as my invention and desire to secure by Letters Patent is:

1. In a photographic apparatus, the combination with an exposure mechanism, a feeding mechanism for a strip of sensitized material, and a common operator for both of said mechanisms, of a detaining means for holding said operator against operation, and means for holding said detaining means out of detaining position until the common operator has been operated a predetermined number of times.

2. In a photographic apparatus, the combination with an exposure mechanism, of a feeding mechanism for feeding a strip of sensitized material to exposure position comprising a spool on which sensitized material is supported, a roller about which the sensitized material passes, spring pressed rollers holding the strip against said roller, and step-by-step feeding mechanism for turning the roller.

3. In a photographic apparatus, the combination with an exposure mechanism, of feeding mechanism for feeding a strip of sensitized material to exposure position, embodying a roller, an oscillatory member having a pawl and ratchet connection with the roller to feed the latter step-by-step, and a detaining member for holding said roller against turning having connection with the oscillatory member for effecting the movement of the detaining member into and out of detaining relation with the feeding roller.

4. In a photographic apparatus, the combination with an exposure mechanism of a feeding mechanism for a strip of sensitized material embodying a roller, a ratchet wheel connected thereto, an oscillatory shaft on which the roller turns, a pawl carried by the shaft and cooperating with the ratchet wheel, a detaining device for the roller, and an arm on the oscillatory shaft having connection with the detaining device to effect the movement of the latter toward and from detaining position.

5. In a photographic apparatus, the combination with an exposure mechanism, of a feeding mechanism for a strip of sensitized material embodying a roller, an oscillatory shaft on which the roller turns, a pawl and ratchet connection between the shaft and the roller to cause the latter to move step-by-step, mechanism connected with the shaft for moving it in one direction to cause said shaft to turn relatively to the roller, and spring means acting on the shaft to cause it to turn in the other direction to turn the roller to feed the strip; an exposure mechanism, and a connection between the exposure mechanism and the oscillatory shaft for effecting the operation of the exposure mechanism when the shaft is turned relatively to the feed roller.

6. In a photographic apparatus, a feeding mechanism for a strip of sensitized material comprising a feed roller, mechanism for turning the feed roller, detaining means for holding said mechanism against operation of the feed roller, and means for holding said detaining means out of detaining position until a predetermined movement of the roller is completed when the detaining means has been moved away from detaining position.

7. In a photographic apparatus, a feeding mechanism for a strip of sensitized material comprising a feed roller, mechanism for turning the feed roller, detaining means for holding said mechanism against operation of the feed roller, and means for holding said detaining means out of detaining position until a predetermined movement of the roller is completed when the detaining means has been moved away from detaining position, said means comprising a disk turning with the roller and having a surface concentric with the axis of turning of the roller, and also having a slot, a movable slot closer mounted on the disk and normally closing the slot, and means carried by the slot closer and means carried by the detaining means, lying in the slot when the detaining means is in detaining position and movable out of the slot to cooperate with the concentric surface when the detaining means is moved away from detaining position, said slot closer being moved by the means on the detaining means to permit the said means to pass from the slot, the closer thereafter closing the slot and holding it closed until again moved out of closing position by said means on the detaining means after the completion of the predetermined movement of the roller so that the detaining means may again enter into detaining relation with the roller turning mechanism.

8. In a photographic apparatus, a feeding mechanism for a strip of sensitized material comprising a feed roller, mechanism for turning the feed roller, detaining means for holding said mechanism against operation of the feed roller, and a rotary holding device for the detaining means turning with the feed roller and engaged with the detaining means when the latter is shifted out of detaining relation with the roller turning mechanism.

9. In a photographic apparatus, the combination with an exposure mechanism, a feeding mechanism for feeding a strip of sensitized material to exposure position, and a severing mechanism for severing an exposed portion of the strip, a common operator for the exposure mechanism and the feeding mechanism, a detaining means for holding the feeding and the exposure mechanism against movement, and mechanism for controlling the detaining means having connection with the severing mechanism to control the latter.

10. In a photographic apparatus, the combination with an exposure mechanism, a feeding mechanism for feeding a strip of sensitized material to exposure position, and a severing mechanism for severing an exposed portion of the strip, of a spring, mechanism connected with the exposure mechanism and the feeding mechanism and movable manually in one direction to effect the operation of the exposure mechanism and to store energy in the spring so that the mechanism will be operated by the spring to operate the strip feeding mechanism, a detaining means for holding said manually operable mechanism against movement, a second spring mechanism connected with the detaining means and the severing means and movable manually in one direction to shift the detaining means away from detaining position and to store energy in the second spring to permit the latter to return the detaining means to detaining position and to effect the operation of the severing means to sever an exposed portion of the strip, and means for holding the second spring against action until the exposure and the feeding mechanisms have completed their operations.

11. In a photographic apparatus, the combination with an exposure mechanism, a feeding mechanism for a strip of sensitized material, and a severing mechanism for exposed portions of the strip, of two manually operable means, one controlling the exposure mechanism and the feeding mechanism, and a detaining means for the said manually controllable mechanism, the other of said manually controllable mechanisms being connected to the detaining means and to the severing mechanism to operate the latter two elements.

12. In a photographic apparatus, the combination with an exposure mechanism, a feeding mechanism for a strip of sensitized material, and an illuminating mechanism, of two manually controllable mechanisms, one having connection with the exposure mechanism and the feeding mechanism and the exposure mechanism, and a detaining means for said one manually controllable mechanism, the other of said manually controllable mechanism having connection with the detaining means and the illuminating means.

JAMES I. MORRALL.